(12) United States Patent
Saito et al.

(10) Patent No.: US 10,207,357 B2
(45) Date of Patent: Feb. 19, 2019

(54) FRICTION STIR WELDING DEVICE

(71) Applicant: IHI Corporation, Tokyo (JP)

(72) Inventors: Hiroshi Saito, Tokyo (JP); Naoki Oiwa, Tokyo (JP); Hisashi Matsuoka, Tokyo (JP); Satoshi Yamanaka, Tokyo (JP); Yasushi Tabei, Tokyo (JP)

(73) Assignee: IHI CORPORATION, Tokyo (JP)

( * ) Notice: Subject to any disclaimer, the term of this patent is extended or adjusted under 35 U.S.C. 154(b) by 150 days.

(21) Appl. No.: 15/285,768

(22) Filed: Oct. 5, 2016

(65) Prior Publication Data

US 2017/0021448 A1    Jan. 26, 2017

Related U.S. Application Data

(63) Continuation of application No. PCT/JP2015/061134, filed on Apr. 9, 2015.

(30) Foreign Application Priority Data

Apr. 9, 2014   (JP) .................................. 2014-080120

(51) Int. Cl.
*B23K 20/12*   (2006.01)
*B23K 37/02*   (2006.01)
(Continued)

(52) U.S. Cl.
CPC ........ *B23K 20/1255* (2013.01); *B23K 20/123* (2013.01); *B23K 20/125* (2013.01);
(Continued)

(58) Field of Classification Search
None
See application file for complete search history.

(56) References Cited

U.S. PATENT DOCUMENTS 5,070,792 A * 12/1991 Harris ................ B23K 37/0211
    104/119
6,237,835 B1   5/2001 Litwinski et al.
(Continued)

FOREIGN PATENT DOCUMENTS

CN    101200021 A    6/2008
JP    1-261533 A    10/1989
(Continued)

Primary Examiner — Devang R Patel
(74) Attorney, Agent, or Firm — Rothwell, Figg, Ernst & Manbeck, P.C.

(57) ABSTRACT

A friction stir welding device includes a pair of workpiece surface plates between which a gap extending along a welding line between workpieces is formed; a welding device body including a rotatable friction stir welding tool protruding upward from the gap; and a linear guide mechanism and a moving device for the welding device body. The moving device has a configuration in which a pair of pin racks extending in a direction along the gap are disposed at symmetrical positions on both sides in a width direction with a position immediately below a tool movement path of the friction stir welding tool as a symmetrical axis, and pin gears that individually mesh therewith are provided in the welding device body so as to be rotatably driven. Respective sets of a pin rack and a pin gear are alternately brought into a strong meshing state during the movement of the welding device body by causing the locations of pins and teeth thereof to deviate from each other by a half pitch.

4 Claims, 6 Drawing Sheets

(51) Int. Cl.
*B23K 20/233* (2006.01)
*B23K 103/10* (2006.01)

(52) U.S. Cl.
CPC ........ *B23K 20/126* (2013.01); *B23K 20/2336* (2013.01); *B23K 37/0211* (2013.01); *B23K 37/0217* (2013.01); *B23K 37/0282* (2013.01); *B23K 37/0294* (2013.01); *B23K 2103/10* (2018.08)

(56) References Cited

U.S. PATENT DOCUMENTS

| | | | |
|---|---|---|---|
| 7,748,592 B2 * | 7/2010 | Koga | B23K 20/1245 228/112.1 |
| 2004/0036936 A1 | 2/2004 | Nakajima et al. | |
| 2013/0221069 A1 | 8/2013 | Saito et al. | |
| 2013/0334289 A1 | 12/2013 | Pacchione et al. | |

FOREIGN PATENT DOCUMENTS

| | | |
|---|---|---|
| JP | 2000-61658 A | 2/2000 |
| JP | 2000-301358 A | 10/2000 |
| JP | 2000-317655 A | 11/2000 |
| JP | 2004-37757 A | 2/2004 |
| JP | 4209537 B2 | 1/2009 |
| JP | 4438409 B2 | 3/2010 |
| WO | 2012/060439 A1 | 5/2012 |

\* cited by examiner

FRICTION STIR WELDING DEVICE

This application is a Continuation of International Application No. PCT/JP2015/061134, filed on Apr. 9, 2015, claiming priority based on Japanese Patent Application No. 2014-080120, filed on Apr. 9, 2014, the contents of which are incorporated herein by reference in their entirety.

TECHNICAL FIELD

Embodiments described herein relates to a friction stir welding device that moves a friction stir welding tool along a welding line between workpieces to perform friction stir welding.

BACKGROUND ART

Friction stir welding is a technique of inserting a probe (also referred to as a pin) of a friction stir welding tool into a welded part between workpieces while rotating the probe, and moving the rotating probe over the entire length of a welding line between the workpieces to perform welding. Accordingly, the workpieces are integrally welded together at the welded part therebetween behind the probe by raising the temperature of the welded part between the workpieces due to the frictional heat generated by the contact between the rotating probe and the workpieces, softening the periphery of the welded part, and stirring and mixing the softened periphery of the welded part through plastic flow accompanying the rotation of the probe.

In recent years, this friction stir welding is actually applied to, for example, mainly welding of the thin plate-shaped aluminum workpieces.

As one type of a friction stir welding device, in the related art, a configuration is suggested in which a frame longer than the length of a welding line along which workpieces are welded to each other, and a pair of workpiece surface plates installed on an upper side of the frame so as to form a gap extending along the welding line between the workpieces are provided, a welding device body, including a main spindle having a friction stir welding tool protruding upward from this gap attached to an upper end thereof and a drive device that rotates this main spindle, is disposed below the gap between the pair of workpiece surface plates, and a linear guide mechanism that supports this welding device body so as to be movable along this gap and a moving device that moves this welding device body along this gap are further provided (for example, refer to Patent Document 1).

During the execution of friction stir welding, the probe of the rotating friction stir welding tool is moved along the welding line in a state where the probe is inserted into the welded part between the workpieces to be welded together. Therefore, large welding reaction forces consisting of a reaction force that acts in a direction reverse to a movement direction of the friction stir welding tool and a reaction force in a rotational direction reverse to a rotational direction of this friction stir welding tool act on the welding device body.

If the movement speed of this friction stir welding tool becomes non-uniform or the shaking thereof in the rotational direction occurs under the influence of the large welding reaction forces, in the friction stir welding along the welding line between the workpieces, it becomes difficult to obtain uniform welding quality over the entire length of this welding line in a longitudinal direction.

Therefore, it is desired that the moving device of the welding device body has high rigidity in the movement direction of this welding device body, and it is desired that the rigidity of the moving device in the rotational direction centered on the friction stir welding tool is also high.

CITATION LIST

Patent Document

[Patent Document 1] PCT International Patent Application Publication No. WO2012/060439

SUMMARY

Technical Problem

The present disclosure provides a friction stir welding device that can enhance the rigidity of a moving device for a welding device body, which moves a welding device body including a friction stir welding tool along a welding line between workpieces, in a direction in which the welding device body is moved, and that can also enhance the rigidity of the moving device in a rotational direction centered on this friction stir welding tool.

Solution to Problem

A first aspect of the present disclosure is a friction stir welding device which includes a pair of workpiece surface plates between which a gap extending along a welding line between workpieces is formed and which are provided on a frame; a welding device body; a main spindle provided in the welding device body; a friction stir welding tool protruding upward from the gap and attached to an upper end of the main spindle; a drive device that rotates the main spindle provided in the welding device body; a linear guide mechanism that supports the welding device body so as to be movable in a direction along the gap; and a moving device that moves the welding device body in the direction along the gap. The moving device includes a plurality of racks provided below the workpiece surface plate in the frame so as to extend in a direction parallel to the gap, and a plurality of rack meshing gears that individually mesh with the respective racks and are rotatably provided in the welding device body. At least a pair of a set of a rack and a rack meshing gear among a plurality of the set of a rack and a rack meshing gear is disposed being apart from each other on both sides of a position immediately below a tool movement path along which the friction stir welding tool moves accompanying the movement of the welding device body, and the pair of a set of a rack and a rack meshing gear are provided such that locations of teeth thereof deviate from each other by a half pitch.

In a second aspect of the present disclosure, the pair of a set of a rack and a rack meshing gear disposed such that the locations of the teeth thereof deviate from each other by a half-pitch are disposed at symmetrical positions with the position immediately below the tool movement path along which the friction stir welding tool moves accompanying the movement of the welding device body as the symmetrical axis.

In a third aspect of the present disclosure, a probe of the friction stir welding tool has a rotational symmetrical shape with an n-fold symmetry, and a pitch t [mm] of gear meshing members in the racks satisfies $t > (600 \cdot v)/(n \times x)$, on the basis of x [rpm] that is the rotation speed of the friction stir welding tool during friction stir welding and a movement speed v [mm/s] of the friction stir welding tool during the friction stir welding.

According to the present disclosure, the following excellent effects are exhibited.

The rigidity of the moving device of the welding device body in the welding traveling direction and the rigidity thereof in the rotational direction centered on the friction stir welding tool can be enhanced. Accordingly, welding quality can be improved.

DESCRIPTION OF EMBODIMENTS

Hereinafter, embodiments for carrying out the present disclosure will be described with reference to the drawings.

FIG. 1 to FIGS. 5A and 5B show an embodiment of a friction stir welding device of the present disclosure.

Figure 1:
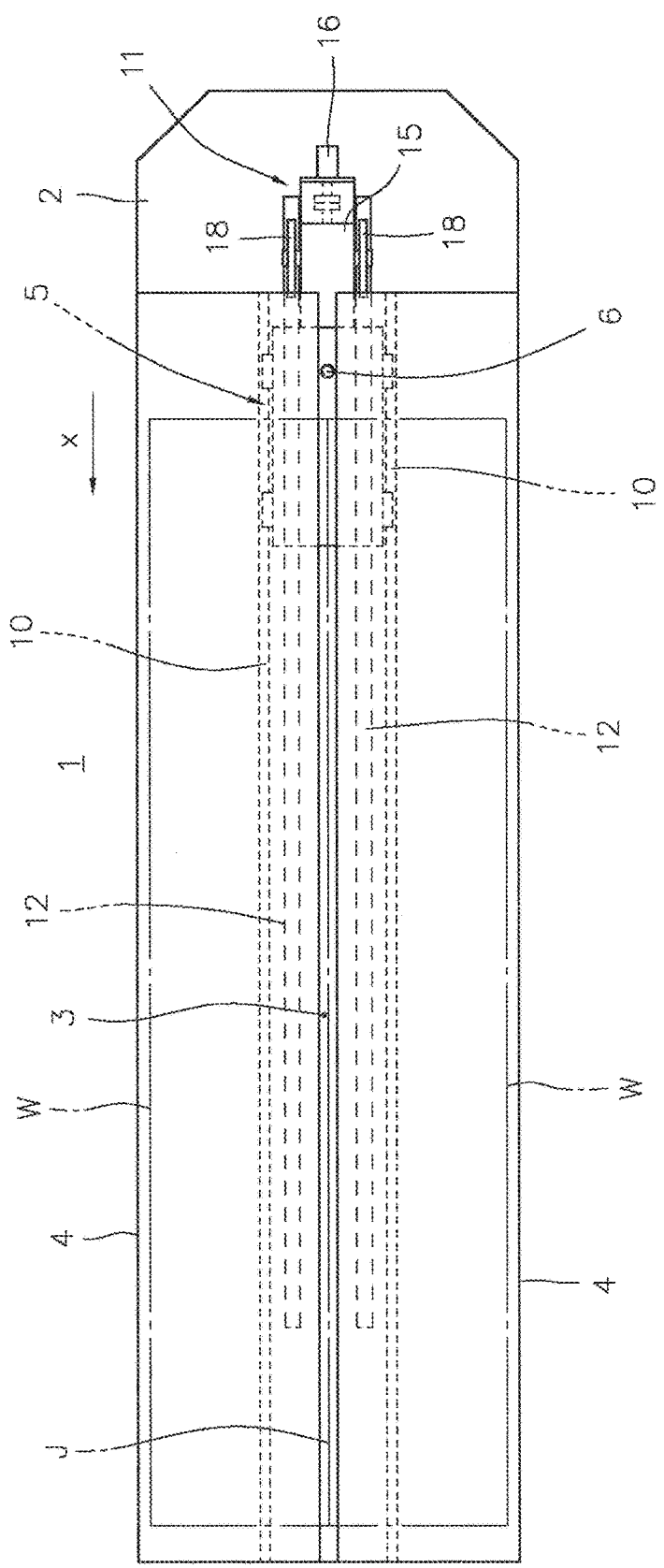
FIG. 1 is a schematic plan view showing an embodiment of a friction stir welding device of the present disclosure.
Figure 2:
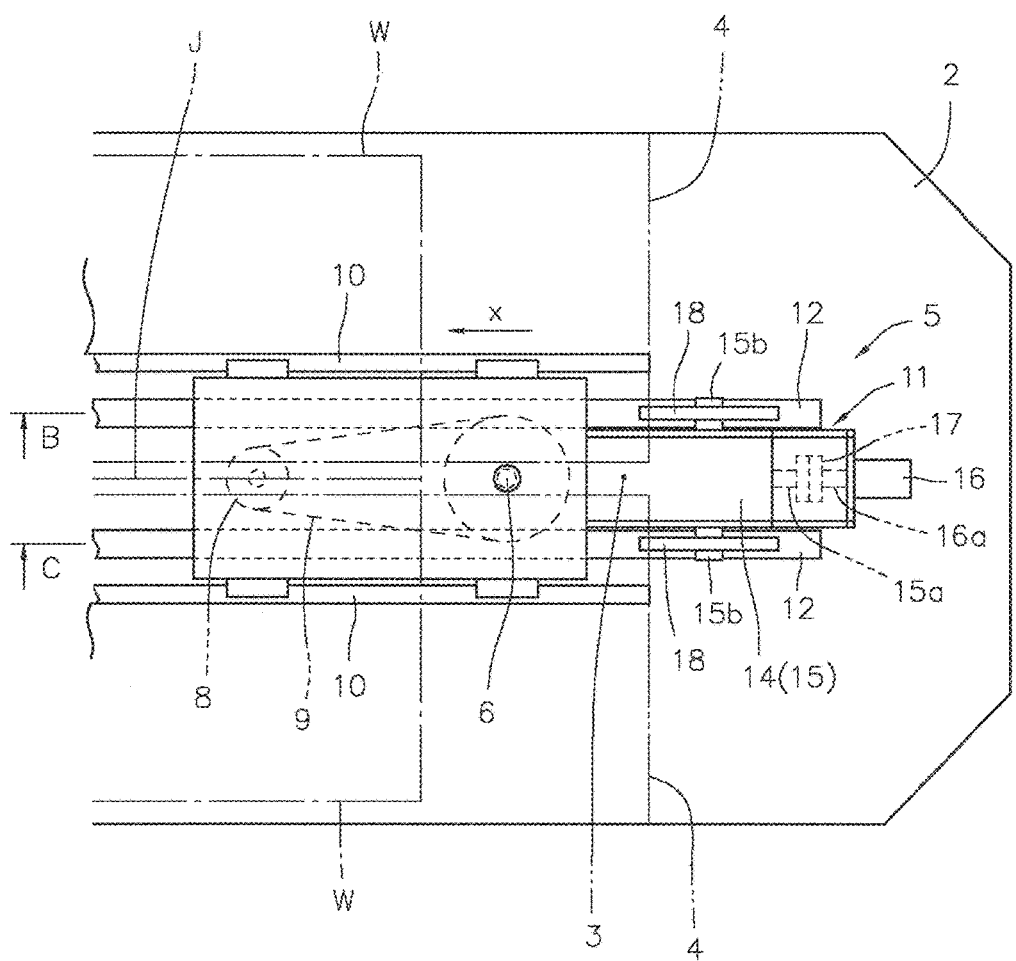
FIG. 2 is an enlarged plan view showing part of welding device body in the friction stir welding device of FIG. 1.

The friction stir welding device of the present disclosure is denoted with reference sign 1 in FIG. 1 and similar to the friction stir welding device described in Patent Document 1, a pair of workpiece surface plates 4 is installed on an upper side of a frame 2 longer than the length of a welding line J where two workpieces W are welded together, in a state where a gap 3 extending along the welding line J between the workpieces W is formed.

As shown in FIGS. 1 to 4, a welding device body 5 including a main spindle 7 that has a friction stir welding tool 6 protruding upward from the gap 3 attached to an upper end thereof, a drive device 8 that rotates the main spindle 7 to generates a rotative force in the main spindle 7, and a power transmission device 9 that transmits the rotative force from the drive device 8 to the main spindle 7 is disposed below a part of one workpiece surface plate 4 where the gap 3 is formed.

The welding device body 5 is supported by the frame 2 via linear guide mechanisms 10 in which both side parts in a horizontal direction (hereinafter referred to as a width direction) orthogonal to a direction (a direction along arrow x in FIGS. 1, 2, FIG. 3) along the gap 3 extends parallel to the gap 3, respectively. Accordingly, the welding device body 5 is movable parallel to the gap 3 via each linear guide mechanism 10.

Moreover, the friction stir welding device 1 of the present disclosure includes a moving device 11 that moves the welding device body 5 along the gap 3.

In the moving device 11, two racks (pin racks) 12 extending in the direction parallel to the gap 3 are provided parallel to each other, in two locations in the width direction sandwiching a position immediately below the gap 3 in an inner bottom part of the frame 2. The locations of the two pin racks 12 are symmetrical positions that are apart from each other by an equal distance in the width direction from a position immediately below a tool movement path, using the position immediately below the tool movement path along which the friction stir welding tool 6 moves along with the movement of the welding device body 5, as an axis of symmetry.

Figure 5A:
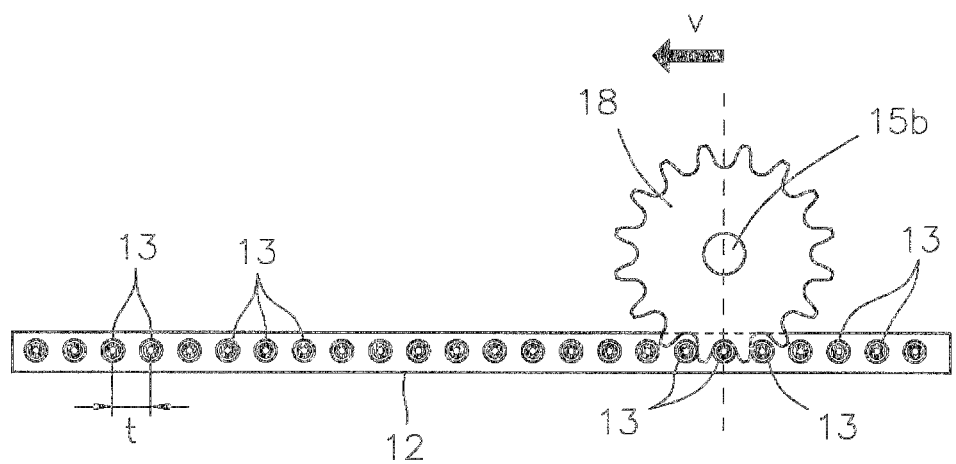
FIG. 5A is an enlarged view as seen in the direction of arrow B of FIG. 2, showing a pinion and a pin rack of a moving device of the welding device body of FIG. 2.
Figure 5B:
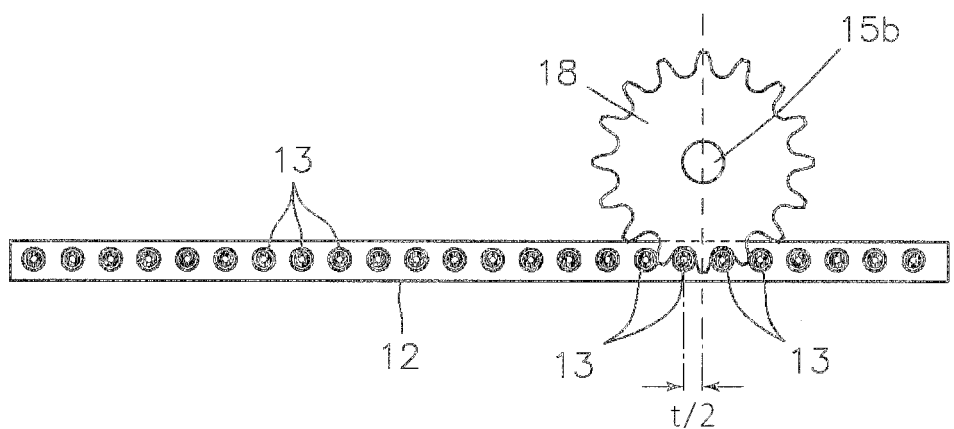
FIG. 5B is an enlarged view as seen in the direction of arrow C of FIG. 2, showing the pinion and the pin rack of the moving device of the welding device body of FIG. 2.

Moreover, as shown in FIGS. 5A and 5B, the two pin racks 12 are installed such that the positions of pins 13 functioning as gear meshing members arranged in a longitudinal direction deviate from each other by a half pitch (t/2 see, e.g., FIG. 5B, and compare with positioning shown in FIG. 5A as discussed further hereinafter) in one pin rack 12 and the other pin rack 12.

On the other hand, a frame 14 that protrudes in the horizontal direction is provided at an upstream end in a welding traveling direction (arrow x direction), in which friction stir welding travels from the one end side of the welding line J between the workpieces W to the other end thereof, in the welding device body 5. A gear box 15 (speed reducer) is attached to the frame 14.

The gear box 15 includes an input shaft 15a on an upstream surface in the welding traveling direction. An output shaft 16a of a traveling motor 16 attached to a protruding end of the frame 14 toward a downstream side in the welding traveling direction is connected to the input shaft 15a via the joint 17.

A pair of output shafts 15b that rotates synchronously is provided on both sides of the gear box 15 in the width direction. A rack meshing gear 18 (pin gear) having a tooth form that meshes with each pin rack 12 is attached to each output shaft 15b. In addition, as shown in FIGS. 5A and 5B, the respective pin gears 18 are attached to the respective output shafts 15b in a position where locations of teeth thereof in a circumferential direction deviate from each other by a half pitch (t/2), according to the locations of the pins 13 of the corresponding pin racks 12.

Figure 3:
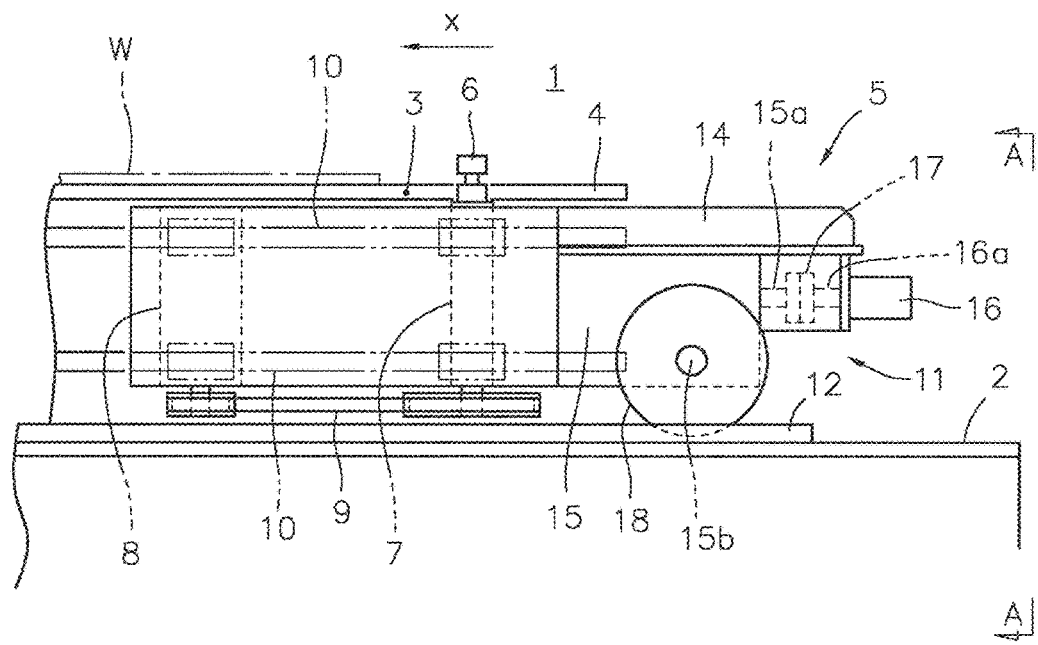
FIG. 3 is an enlarged sectional side view showing part of the welding device body in the friction stir welding device of FIG. 1.
Figure 4:
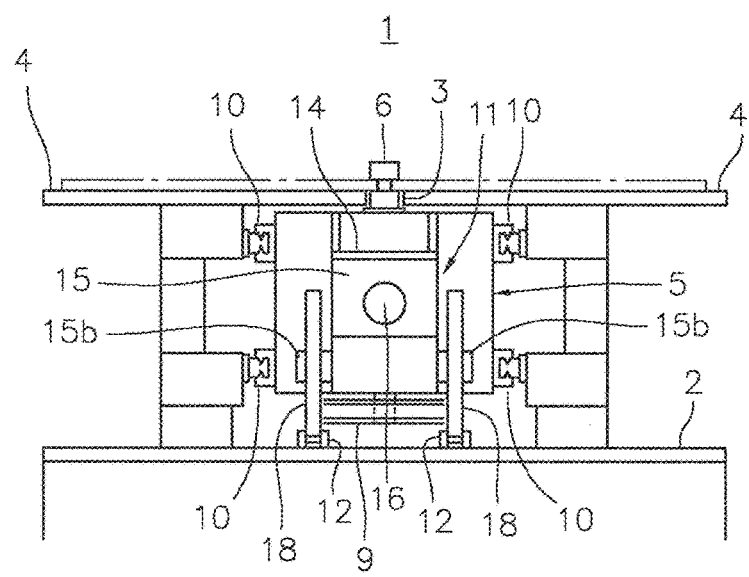
FIG. 4 is a view as seen in the direction of arrow A-A of FIG. 3.

According to the moving device 11 having the above configuration, the welding device body 5 can be made to travel in the welding traveling direction (the direction of arrow x) along the two pin racks 12 by driving the traveling motor 16 to rotate the respective pin gears 18 in the counterclockwise direction in FIG. 3 via the gear box 15.

In this case, each pin gear 18 alternately is in a position where the pin gear is in contact with a corresponding pin rack 12 at a bottom part thereof and meshing is strong, as shown in FIG. 5A, and a position in which the pin gear is in contact with the corresponding other pin rack 12 at a tooth tip part and meshing is weak, as shown in FIG. 5B.

However, in one pin gear 18 of the moving device 11 in the width direction and the other pin gear 18 of the moving device in the width direction, the locations of the teeth in the circumferential direction deviate from each other by a half pitch (t/2). For example, when one pin gear 18 in the width direction is in a position where the meshing thereof with a corresponding pin rack 12 becomes weak as shown in FIG.

5B, the other pin gear 18 in the width direction is in a position where the meshing thereof with a corresponding pin rack 12 is strong as shown in FIG. 5A.

If each pin gear 18 rotates at a angle equivalent to a half pitch (t/2) of the locations of the teeth thereof in the circumferential direction from this state, the other pin gear 18 in the width direction is in a position where the meshing thereof with a corresponding pin rack 12 is weak, as shown in FIG. 5B, whereas one pin gear 18 in the width direction is in a position where the meshing thereof with a corresponding pin rack 12 is strong, as shown in FIG. 5A.

Thereafter, in the moving device 11, by synchronously rotating the respective pin gears 18 provided on both sides in the width direction, each of one pin gear 18 and the other pin gear 18 in the width direction alternately is in a state where the meshing thereof with a corresponding pin rack 12 is strong and a state where the meshing thereof with the corresponding pin rack 12 is weak.

Therefore, the moving device 11 is not brought into a state where the meshing of the two pin gears 18 with the pin racks 12 is weak simultaneously. Hence, the moving device 11 can enhance rigidity in this welding traveling direction when moving the welding device body 5 in the welding traveling direction (the direction of arrow x) for the execution of friction stir welding.

Moreover, since positions where the respective pin gears 18 alternately mesh with the corresponding pin racks 12 in a state where the meshing thereof is strong are symmetrical positions having with the position immediately below the tool movement path as a symmetrical axis, the distances thereof from the friction stir welding tool 6 provided in the welding device body 5 are equal to each other. For this reason, in the moving device 11, reaction forces in a rotational direction that the friction stir welding tool 6, which is rotated during friction stir welding, receive from each workpiece W can be sequentially received with the same moment in a state where the respective pin gears 18 alternately mesh with the corresponding pin racks 12 in a state where the meshing thereof is strong. Thus, the fluctuation of rigidity that receive the reaction forces in the rotational direction can be suppressed.

Therefore, the moving device 11 can also enhance the rigidity against the forces in the rotational direction centered on the friction stir welding tool 6.

In addition, the present inventors obtain the following knowledge on friction stir welding in the process of development of the friction stir welding device 1 of the present disclosure.

Figure 6A:
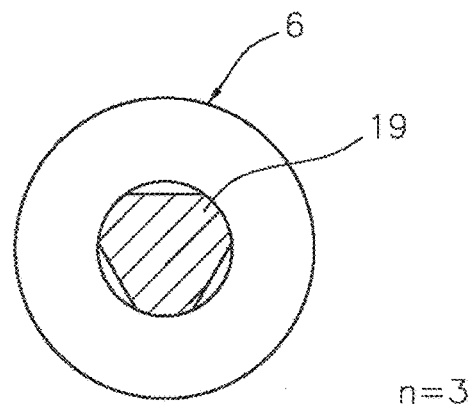
FIG. 6A is a sectional plan view showing a rotational symmetrical shape with a three-fold symmetry of a probe of a friction stir welding tool.
Figure 6B:
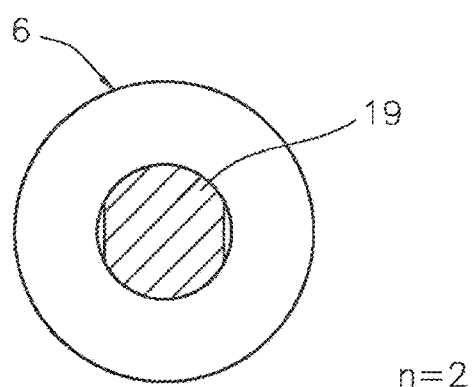
FIG. 6B is a sectional plan view showing a rotational symmetrical shape with a two-fold symmetry of the probe of the friction stir welding tool.
Figure 6C:
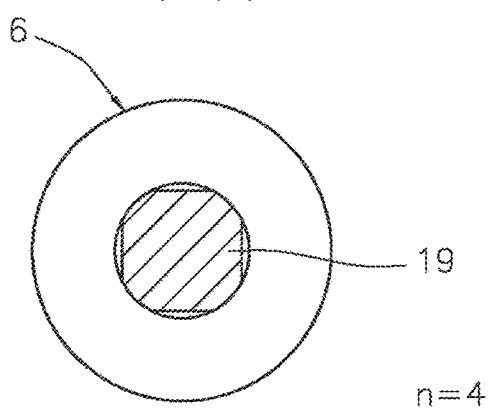
FIG. 6C is a sectional plan view showing a rotational symmetrical shape with a four-fold symmetry of the probe of the friction stir welding tool.

As shown in FIGS. 6A, 6B, and 6C, in a case where the friction stir welding tool 6 includes the probe 19 having a rotational symmetrical shape with an n-fold symmetry (n is two or more integers) centered on an axial center, if the rotation speed of the friction stir welding tool 6 is set to x [rpm] and friction stir welding is executed, it turned out that a vibration of $(n \times x)/60$ [Hz] is generated in the welding device body 5 even in a state where the entire probe 19 of the friction stir welding tool 6 is sunk within each workpiece W.

That is, for example, in a case where the probe 19 of the friction stir welding tool 6 has a shape obtained by chamfering three sides of an outer peripheral surface of a column shown in FIG. 6A, that is, a rotational symmetrical shape with a three-fold symmetry (n=3), if the rotation speed of the friction stir welding tool 6 is set to x [rpm] and friction stir welding is executed, a vibration of $3x/60$ [Hz] is generated in the welding device body 5.

FIGS. 6B and 6C show examples of a rotational symmetrical shape with a two-fold symmetry (n=2) and a rotational symmetrical shape with a four-fold symmetry (n=4), respectively.

On the other hand, in the moving device 11 of the welding device body 5, as shown in FIG. 5A, in a case where the arrangement pitch of the pins 13 in each pin rack 12 of the moving device 11 is t [mm], if the movement speed, in the welding traveling direction, of the friction stir welding tool 6 during friction stir welding is set to v [mm/s], a vibration of v/t [Hz] is apt to be generated in the moving device 11.

On the basis of these kinds of knowledge, in the friction stir welding device 1 of the present disclosure, the arrangement pitch t [mm] of the pins 13 in each pin rack 12 of the moving device 11 is selected so as to satisfy the conditions shown in the following formulas such that the cycle $((n \times x)/60$ [Hz]) of the vibration generated in the welding device body 5 due to the rotational symmetrical shape of the friction stir welding tool 6 deviate in the order of 10 times or more from the cycle (v/t [Hz]) of the vibration generated in the moving device 11 during friction stir welding.

$$(v/t) \times 10 < (n \times x)/60$$

$$\therefore t > (10 \cdot v) \times \{60/(n \times x)\} = (600 \cdot v)/(n \times x)$$

By adopting this configuration, the friction stir welding device 1 of the present disclosure keeps the vibration generated in the moving device 11 from resonating with the vibration generated in the welding device body 5, and influence on the rigidity of the moving device 11 in the welding traveling direction and the rigidity thereof in the rotational direction centered on the friction stir welding tool 6, which are caused by these kinds of vibration, is reduced.

Moreover, in order to more reliably prevent the above resonance to further reduce the influence on the rigidity of the moving device 11 in the welding traveling direction and the rigidity thereof in the rotational direction centered on the friction stir welding tool 6, it is preferable to make settings that also satisfy the conditions shown in the following formula such that the cycle $((n \times x)/60$ [Hz]) of the vibration generated in the welding device body 5 does not reach an integral multiple of the cycle (v/t [Hz]) of the vibration generated in the moving device 11.

$$(v/t) \times m \neq (n \times x)/60 \, (m \text{ is a positive integer})$$

By rotationally driving the respective pin gears 18 in the clockwise direction in FIG. 3 via the gear box 15 through the operation of the traveling motor 16 in a reverse direction in the moving device 11 after the execution of the friction stir welding of the workpieces W is completed, the welding device body 5 can be returned to the upstream side in the welding traveling direction (the direction of arrow x).

In this way, in the friction stir welding device 1 of the present disclosure, the rigidity of the moving device 11 of the welding device body 5 in the welding traveling direction and the rigidity thereof in the rotational direction centered on the friction stir welding tool 6 can be enhanced.

For this reason, even if the welding device body 5 receives large welding reaction forces that acts in the direction reverse to the welding traveling direction and in the direction reverse to the rotational direction of the friction stir welding tool 6 during friction stir welding, a possibility that the movement speeds of the welding device body 5 and the friction stir welding tool 6 in the welding traveling direction become non-uniform or the shaking thereof in the rotational direction occurs can be prevented. Therefore, in the execution of the friction stir welding along the welding line J between the workpieces W, uniform welding quality can be obtained over the entire length of the welding line J in the longitudinal direction.

Figure 7A:
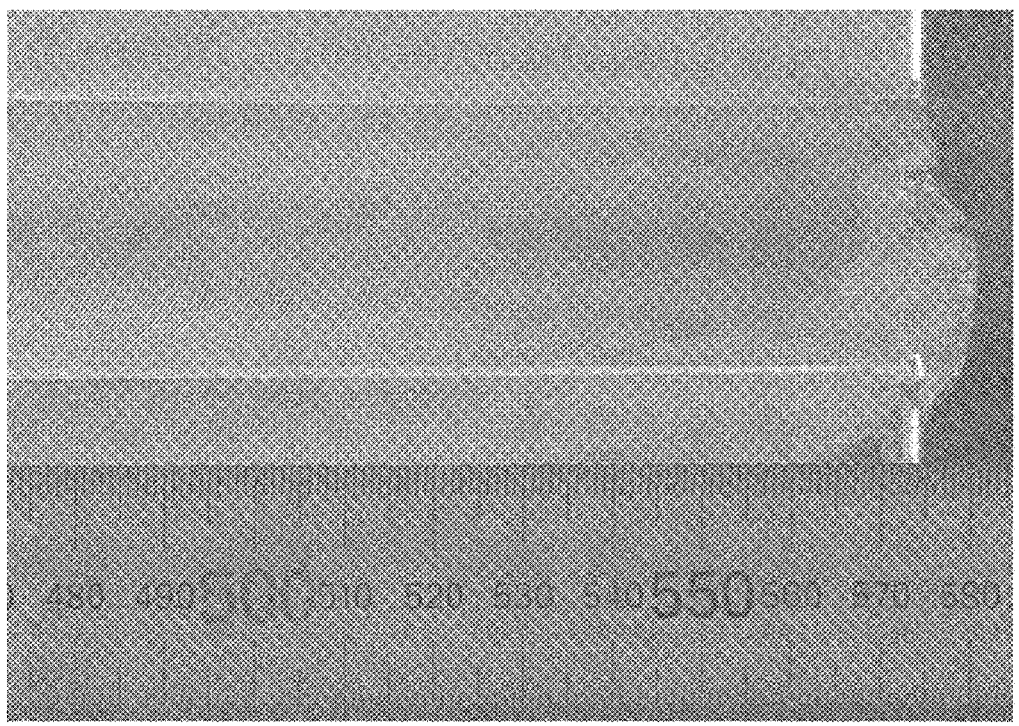
FIG. 7A is a photograph showing a welded part formed by the friction stir welding of the present disclosure.
Figure 7B:
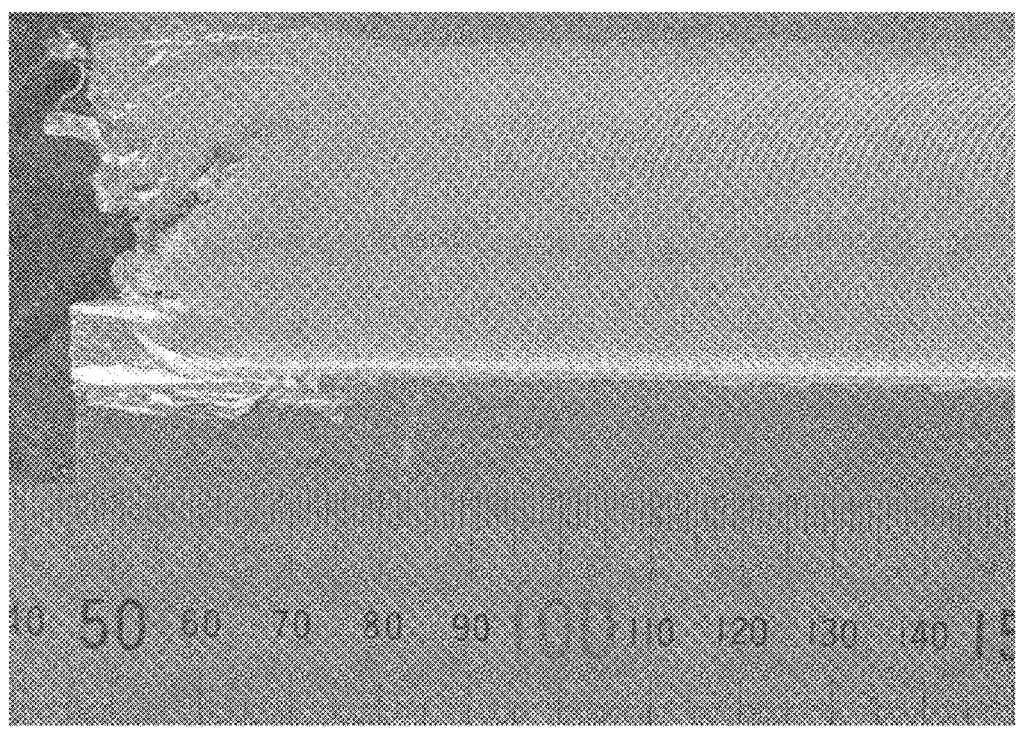
FIG. 7B is a photograph showing a welded part formed by the friction stir welding of the related art.

Here, a welded part formed by the friction stir welding of the present disclosure shown in FIG. 7A is compared with a welded part formed by the friction stir welding of the related art shown in FIG. 7B. In FIG. 7A, friction stir welding is executed from the right of FIG. 7A toward the left thereof. In FIG. 7B, friction stir welding is executed from the left of FIG. 7B toward the right thereof. Therefore, the vicinities of starting points for friction stir welding are shown in both of FIGS. 7A and 7B. A welded part in the vicinity of the starting point for friction stir welding of FIG. 7B (in the vicinity of a left end of FIG. 7B) is disordered. This is because the welded part formed by the friction stir welding according to the related art is influenced by the fluctuation of a welding reaction force when starting friction stir welding. In contrast, the welded part in the vicinity of the starting point for friction stir welding of FIG. 7A (in the vicinity of a right end of FIG. 7A) is stable. Therefore, in the welded part formed by the friction stir welding according to the present disclosure, welding quality that is more excellent than the related art is obtained. This can be confirmed from FIGS. 7A and 7B.

In addition, in the moving device 11, the combination of the pin rack 12 having the pins 13 serving as the gear meshing members and the pin gears 18 serving as the rack meshing gear is used as a rack. Therefore, a large propulsive force can be obtained, and the precision of meshing can be easily enhanced.

Moreover, in the moving device 11, each pin gear 18 is disposed on the upstream side in the welding traveling direction with respect to the welding device body 5. Thus, when friction stir welding is executed, the traveling (movement) of the welding device body 5 in the welding traveling direction can be performed by causing a propulsive force generated by the pin gear 18 to be rotated to act on the welding device body 5 in a pushing direction. Accordingly, when friction stir welding is executed, a large propulsive force, which may be required to move the probe 19 of the friction stir welding tool 6 in the welding traveling direction in a state where the probe is sunk into each workpiece W, can be easily applied to the welding device body 5.

In addition, the present disclosure is not limited only to the above embodiment. In the moving device 11, the frame 2 may be provided with three or more pin racks 12, and three or more pin gears 18 that mesh with the respective pin racks 12 may be rotatably provided on the welding device body 5 side. In this case, a set of at least two pin racks 12 just has to be disposed at symmetrical positions apart from the tool movement path by the equal distance in the width direction, with the position immediately below the tool movement path of the friction stir welding tool 6 as the symmetrical axis.

In the moving device 11, in order to obtain a large propulsive force and easily enhance the precision of meshing, it is desirable to use the combination of the pin racks 12 and the pin gears 18. However, a rack having teeth as gear meshing members, and a pinion gear serving as a rack meshing gear having a tooth form that meshes with this rack may be used.

As long as the welding device body 5 can be guided so as to be movable along the gap 3 provided between the pair of workpiece surface plates 4, the arrangement or the number of linear guide mechanisms 10 interposed between the welding device body 5 and the frame 2 may be changed appropriately.

The friction stir welding device 1 may include a workpiece securing device that positions and secures each workpiece W placed on each workpiece surface plate 4, on the upper side of each workpiece surface plate 4.

The probe 19 of the friction stir welding tool 6 may have a rotational symmetrical shape with an one-fold symmetry or a rotational symmetrical shape with an n-fold symmetry, for example, a five-fold or more symmetry, in addition to those shown in FIGS. 6A, 6B, and 6C.

In addition, various changes can be added without departing from the concept of the present disclosure.

INDUSTRIAL APPLICABILITY

According to the friction stir welding device according to the present disclosure, the rigidity of the moving device of the welding device body in the welding traveling direction and the rigidity thereof in the rotational direction centered on the friction stir welding tool can be enhanced. Accordingly, welding quality can be improved.

What is claimed is:
1. A friction stir welding device comprising:
a pair of workpiece surface plates between which a gap extending along a welding line between workpieces is formed and which are provided on a frame;
a welding device body;
a main spindle provided in the welding device body;
a friction stir welding tool protruding upward from the gap and attached to an upper end of the main spindle;
a drive device that rotates the main spindle provided in the welding device body;
a linear guide mechanism that supports the welding device body so as to be movable in a direction along the gap; and
a moving device that moves the welding device body in the direction along the gap including:
a first set comprising a first rack and a first rack meshing gear; and a second set comprising a second rack and a second rack meshing gear, wherein the first rack and the second rack are located below the workpiece surface plates on the frame so as to extend in a direction parallel to the gap, and the first rack meshing gear and the second rack meshing gear individually mesh respectively with the first rack and the second rack, and wherein the first rack meshing year and the second rack meshing gear are each rotatably mounted in the welding device body,
wherein the first set comprising the first rack and the first rack meshing gear and the second set comprising the second rack and the second rack meshing gear are disposed spaced apart from each other on opposite sides of a position immediately below a tool movement path along which the friction stir welding tool moves accompanying movement of the welding device body, and
teeth of the first rack meshing gear deviate from teeth of the second rack meshing gear by a half pitch.
2. The friction stir welding devices according to claim 1, wherein the first set comprising the first rack and the first rack meshing gear and the second set comprising the second rack and the second rack meshing gear are disposed at symmetrical positions with respect to the position immediately below the tool movement path along which the friction stir welding tool moves accompanying the movement of the welding device body as the symmetrical axis.

3. The friction stir welding device according to claim 1, wherein a probe of the friction stir welding tool has a rotational symmetrical shape with an n-fold symmetry, where n is an integer more than or equal to 1, and a pitch t [mm] of gear meshing members in the racks satisfies $t > (600 \cdot v)/(n \times x)$, on the basis of x [rpm] that is the rotation speed of the friction stir welding tool during friction stir welding and a movement speed v [mm/s] of the friction stir welding tool during the friction stir welding.

4. The friction stir welding device according to claim 2, wherein a probe of the friction stir welding tool has a rotational symmetrical shape with an n-fold symmetry, where n is an integer more than or equal to 1, and a pitch t [mm] of gear meshing members in the racks satisfies $t > (600 \cdot v)/(n \times x)$, on the basis of x [rpm] that is the rotation speed of the friction stir welding tool during friction stir welding and a movement speed v [mm/s] of the friction stir welding tool during the friction stir welding.

\* \* \* \* \*